(12) United States Patent
Pream

(10) Patent No.: US 11,693,596 B2
(45) Date of Patent: Jul. 4, 2023

(54) PRE-EMPTIVE STORAGE STRATEGIES TO REDUCE HOST COMMAND COLLISIONS

(71) Applicant: Seagate Technology LLC, Fremont, CA (US)

(72) Inventor: Jeffrey J. Pream, Berthoud, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/389,856

(22) Filed: Jul. 30, 2021

(65) Prior Publication Data

US 2022/0050633 A1 Feb. 17, 2022

Related U.S. Application Data

(60) Provisional application No. 62/706,384, filed on Aug. 13, 2020.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/0652
See application file for complete search history.

(56) References Cited

U.S. PATENT DOCUMENTS

| 4,750,112 | A | 6/1988 | Jones et al. |
| 7,076,606 | B2 | 7/2006 | Orsley |
| 7,978,516 | B2 | 7/2011 | Olbrich et al. |
| 8,626,986 | B2 | 1/2014 | Wu et al. |
| 9,152,333 | B1 | 10/2015 | Johnston et al. |
| 9,170,891 | B1 | 10/2015 | Vincent |
| 10,049,040 | B2 | 8/2018 | Ebsen et al. |
| 10,528,464 | B2 | 1/2020 | Ishiyama et al. |
| 10,642,505 | B1 * | 5/2020 | Kuzmin ............... G06F 3/0679 |
| 10,684,964 | B1 * | 6/2020 | Gordon ............... G06F 3/0634 |
| 2019/0121740 | A1 * | 4/2019 | Kabra ................... G06F 12/10 |
| 2019/0212934 | A1 * | 7/2019 | Chopra ............... G06F 3/0604 |
| 2020/0394133 | A1 * | 12/2020 | Carpenter ........... G06F 3/0608 |
| 2020/0409890 | A1 * | 12/2020 | Bueb .................. G06F 13/4027 |
| 2021/0182219 | A1 * | 6/2021 | Benisty ............. G06F 11/1048 |

(Continued)

*Primary Examiner* — Charles Rones
*Assistant Examiner* — Tong B. Vo
(74) *Attorney, Agent, or Firm* — Hall Estill Law Firm; Randall K. McCarthy

(57) ABSTRACT

Method and apparatus for managing data in a storage device, such as a solid-state drive (SSD). A data storage device includes a main non-volatile memory (NVM) and a command queue that lists pending data transfer commands to transfer data between the NVM and a local memory. A collision manager predicts future collisions among the pending data transfer commands, such as but not limited to commands involving pending host commands from a host. A storage manager enacts a change in a storage policy to reduce a future rate of the predicted future collisions. The change in storage policy may involve duplication of write data so that the write data are written to multiple locations within the NVM. The change in storage policy may further involve a pre-emptive garbage collection operation upon an existing location to distribute current version data blocks to multiple locations within the NVM.

20 Claims, 5 Drawing Sheets

(56) References Cited

U.S. PATENT DOCUMENTS

| | | | |
|---|---|---|---|
| 2021/0240391 A1* | 8/2021 | Shin | G06F 3/061 |
| 2021/0278999 A1* | 9/2021 | Chun | G06F 3/0604 |
| 2021/0334208 A1* | 10/2021 | Proulx | G06F 11/3409 |
| 2021/0397377 A1* | 12/2021 | Lee | G06F 11/0751 |
| 2022/0035530 A1* | 2/2022 | Vikram Singh | G06F 3/0604 |

* cited by examiner

PRE-EMPTIVE STORAGE STRATEGIES TO REDUCE HOST COMMAND COLLISIONS

RELATED APPLICATION

The present application makes a claim of domestic priority to U.S. Provisional Patent Application No. 62/706,384 filed Aug. 13, 2020, the contents of which are hereby incorporated by reference.

SUMMARY

Various embodiments of the present disclosure are generally directed to a method and apparatus for enhancing performance of a storage device, such as a solid-state drive (SSD).

In some embodiments, an apparatus includes a main non-volatile memory (NVM) and a command queue that lists pending data transfer commands to transfer data between the NVM and a local memory. A collision manager predicts future collisions among the pending data transfer commands, such as but not limited to commands involving pending host commands from a host. A storage manager enacts a change in a storage policy associated with the NVM to reduce a future rate of the predicted future collisions. The change in storage policy may involve duplication of write data so that the write data are written to multiple locations within the NVM. The change in storage policy may additionally or alternatively be a change in a garbage collection policy which may involve a pre-emptive garbage collection operation upon an existing location to distribute current version data blocks to multiple locations within the NVM.

These and other features and advantages which characterize the various embodiments of the present disclosure can be understood in view of the following detailed discussion and the accompanying drawings.

DETAILED DESCRIPTION

Figure 1:
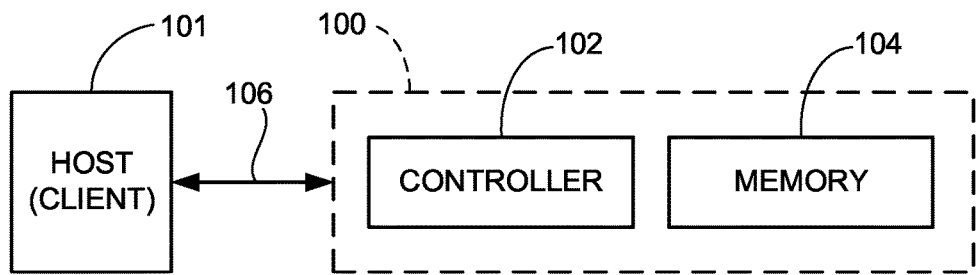
FIG. 1 provides a functional block representation of a data storage device constructed and operated in accordance with various embodiments of the present disclosure.

The present disclosure generally relates to the management of data transfer commands in a data storage device, such as but not limited to a solid-state drive (SSD).

Storage devices generally include a controller and a non-volatile memory (NVM). The controller communicates with a host (client) device to direct the storage of user data from the client device to the NVM, and to retrieve and transfer the user data from the NVM to the client device.

Solid-state drives (SSDs) are a popular form of storage device commonly used in current generation storage systems. A typical SSD has an SSD controller and a non-volatile memory (NVM) arranged as a flash memory. The flash memory includes front end electronics (FME) and multiple flash memory semiconductor dies coupled to shared channels, which are physical data pathways connected to the dies as well as associated control circuitry. Internal data transfer commands are issued by the SSD controller to the flash memory to transfer data between local memory (data caches, buffers, etc.) of the controller and the flash memory.

The commands issued by the controller can take a variety of forms, including reads, writes (programming) and erasures. Reads retrieve data from the NVM, writes program data to the NVM, and erasures reset the NVM to accommodate new data. Other forms of commands can be issued as well, such as calibration commands, status commands, data commands, etc.

The commands issued by the controller can further be segregated into host commands and background commands. Host commands, such as host read or write commands, are initiated by the external host (client). Background commands are those generated by the controller to prepare and maintain the device in a condition available to service the host commands. Background commands can include data relocation commands where data sets are relocated to a new location, garbage collection commands where locations of memory are reclaimed to store new data, calibration operations where parameters are measured to ensure the writing and reading of data can be carried out efficiently under the current environmental conditions, map metadata updates where map metadata are loaded to local memory, updated and then stored to NVM, and so on.

The NVM may be arranged into garbage collection units (GCUs), which are separately erased and allocated as a unit. One commonly employed convention is to form each GCU to incorporate a separate erasure block from each of N semiconductor memory dies, where N is a large plural number. In this way, a data set (parity set) can be distributed across the N dies, with the parity set made up of user data plus parity information to recover the user data based on a system error, such as the failure of one or more of the dies. One currently employed embodiment sets the number of blocks at 32 (e.g., N=32) so that each GCU is made up of one erasure block from each of 32 dies, and each parity set comprises 32 pages of data, with a separate page written to a different die. The parity information can be generated using well known RAID (redundant array of independent discs) techniques, such as RAID 5, RAID 7, etc. Other data storage configurations can be used.

A garbage collection operation involves identifying current version user data blocks in a selected GCU, reading these current version data blocks out of the selected GCU, and rewriting these current version data blocks to a new GCU elsewhere in the flash memory. The selected GCU is then subjected to an erasure operation to erase (reset) the selected GCU, allowing the erased GCU to be returned to an allocation pool pending allocation for the storage of new write data. The number of program/erase (P/E) cycles is usually tracked on a GCU basis, since erasable memories such as flash have a limited number of P/E cycles that can be applied to the flash memory cells over the operational life of the memory.

The map metadata structures may include a forward map, which serves as a flash transition layer (FTL) to provide a logical-to-physical translation to enable the system to locate the requested data. Because flash memories are erasable, new blocks of data need to be written to new locations, and older versions of the data blocks with the same logical addressing need to be marked as stale. Hence, each write operation involves not only the preparation and writing of the write data to a new location, but also requires the updating of the map metadata to enable the system to locate the most current version of the data.

As noted above, garbage collection refers to a process whereby sections of the memory are reclaimed for the storage of new user data. Garbage collection is performed on a GCU basis, and is usually enacted once the percentage of stale data in a given GCU reaches a selected threshold. Garbage collection can also be performed to maintain at least a selected amount of available storage capacity in the NVM to accommodate new write data.

Pending data transfer commands (whether host commands or background commands) are accumulated into one or more command queues. A queue manager mechanism is used to select among these various queues to identify an appropriate order in which the commands are executed. Depending upon the operational environment, the queue manager will tend to assign priority to host commands over background commands, and further will tend to give priority to host read commands over host write commands.

These differentiations among different types of commands are based on the fact that the timely completion of host commands will tend to have a greater impact on host I/O performance as compared to background commands. Moreover, priority among host commands tends to be given to read commands over write commands because writeback caching can be applied in some configurations so that write data from a host can be cached and delayed before writing to the NVM, but the host can tell whether the storage device has returned the requested data. Because host processes are usually waiting to receive the requested data, host read commands are usually given the highest priority and the system works to provide host readback data at or above some minimum specified I/O rate, and then perform the remaining types of commands at some rate that ensures long term satisfactory performance.

Collisions refer to situations where multiple pending commands in the command queue(s) require overlapping resources within the SSD in order to be executed, and so the commands cannot be carried out at the same time. Normally, at any given time, one command is selected for execution, and the remaining command(s) are placed on hold until the necessary resource(s) become available. A certain level of collisions is unavoidable based upon the use of distributed and shared resources within the storage device, but reducing collisions, particularly collisions involving host read commands, is advantageous in that higher sustained host I/O performance can be obtained.

Various embodiments of the present disclosure are generally directed to the performance of preemptive garbage collection operations to reduce the occurrence of collisions that impact host I/O performance. An emphasis may be made upon host read commands, since these tend to have the greatest priority, although other forms of commands can be prioritized as well. Some embodiments contemplate the operations take place in an SSD, although other arrangements are contemplated. For example, the various embodiments presented herein can be adapted for use in other forms of storage devices, such as but not including hard disc drives (HDDs), hybrid drives, tape drives, optical drives, etc. Moreover, while presently presented embodiments contemplate the environment of a single storage device, arrays of storage devices such as in cloud computing environments and other forms of distributed storage are readily contemplated and covered as well.

An operative principle in at least some embodiments is an effort to predict, and prevent, command collisions involving host read commands. In some embodiments, a monitor function in a storage device controller monitors several factors in an effort to predict future read host collisions. One factor that can be monitored is queue depth, which can be defined as the total number of pending data transfer commands in a command queue (or multiple queues, viewed as a single combined queue); the pending data transfer commands may include host reads, host writes, both host reads and writes, or other forms or combinations of pending commands. While host command queue depth is contemplated, other command queues can be used as well, such as queues that maintain and control a backlog of pending background commands, etc.

When the number of applicable commands in the command queue reaches a selected threshold, corrective actions are taken with regard to the writing of new data sets. In some cases, data are duplicated in different locations. For example, a particular write data set may be written to both a first GCU and a second GCU, where the two GCUs can be accessed simultaneously so that there is no overlapping of required resources in order for the commands to be executed among the first and second GCUs. In other cases, sets of hot data, such as data blocks over a particular logical range, can be distributed within the NVM such that a first portion, or a first copy, of the hot data may be written to the first GCU and a second portion, or a second copy, of the hot data may be written to the second GCU. Hot data represents data having relatively higher host interest. Identifying certain data sets as hot data can be carried out including based on recent history data regarding write and/or read activity.

Embodiments presented herein can include a detection operation where various factors (actual collisions, die activity, QoS stats, die accesses, etc.) are monitored with a view towards predicting future read collisions. An action operation involves distributing the hot data in a number of ways such as segregation and/or duplication. Segregation generally involves writing the hot data across multiple locations that utilize different resources. Duplication involves writing the hot data multiple times so that multiple copies of the data are placed in multiple locations, including locations that use independent resources to access. The duplication of hot data will necessarily increase write amplification and reduce endurance, but will enhance readback performance. This can be monitored and set at the user level or adjusted internally by the storage device.

These and other features and advantages of various embodiments can be understood beginning with a review of FIG. 1 which provides a functional block representation of a data storage device 100. The storage device 100 is coupled to a host (client) device 101.

The storage device 100 includes a controller 102 and a memory 104. The controller 102 provides top-level control of the memory 104 and processes communications with the client 101. The memory 104 provides non-volatile memory (NVM) for the storage of user data from the client. The controller 102 is an electrical circuit that may take the form of a programmable CPU processor that operates in conjunction with programming stored in a computer memory within the device. The controller may alternatively be a hardware based circuit, or may incorporate both programmable and hardware circuit aspects. Commands and data are transferred between the client device 101 and the storage device 100 using a suitable host interface 106.

Figure 2:
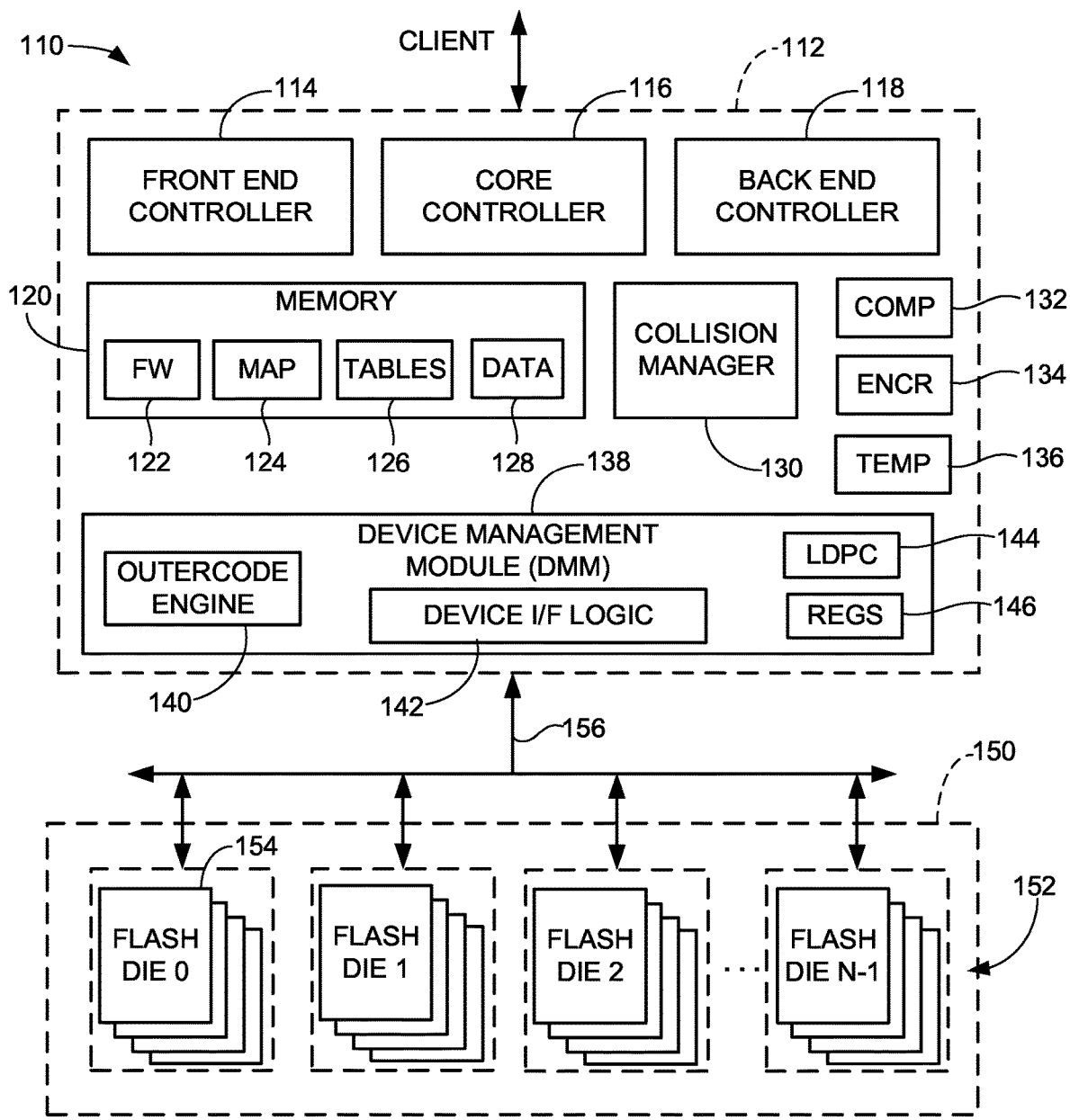
FIG. 2 illustrates the device of FIG. 1 characterized as a solid-state drive (SSD) in accordance with some embodiments.

FIG. 2 describes relevant aspects of an exemplary data storage device 110 corresponding to the device 100 of FIG. 1. The device 110 is a solid-state drive (SSD) that communicates with one or more client devices via one or more Peripheral Component interface Express (PCIe) ports. The NVM comprises 31) NAND flash memory, although other forms of memory can be used. While an SSD is being presented as a particularly useful form of storage device, it will be understood that other forms of storage devices can be utilized as well. Moreover, the following discussion can be equally applied to other storage environments, including arrays of storage devices that incorporate SSDs and/or other forms of storage devices.

In at least some embodiments, the SSD 110 operates in accordance with the NVMe (Non-Volatile Memory Express) specification, which enables different users to allocate NVM sets (die sets) for use in the storage of data. Each die set may form a portion of an NVMe namespace that may span multiple SSDs or be contained within a single SSD. Each NVMe namespace will be owned and controlled by a different user (owner).

The SSD 110 includes a controller circuit 112 that corresponds to the controller 102 in FIG. 1. The controller circuit 112 has a front end controller 114, a core controller 116 and a back end controller 118. The front end controller 114 performs host I/F functions, the back end controller 118 directs data transfers with the memory module and the core controller 116 provides top level control for the device.

Each controller 114, 116 and 118 includes a separate programmable processor with associated programming (e.g., firmware, FW) in a suitable memory location, as well as various hardware elements to execute data management and transfer functions. Alternatively, some or all of the controllers 114, 116 and 118 may be realized using a single processor. A controller memory 120 represents various forms of volatile and/or non-volatile memory (e.g., SRAM, DDR DRAM, flash, etc.) utilized as local memory by the controller 112. Various data structures and data sets may be stored by the memory including loaded firmware (FW) 122, map data 124, table data 126 and user data 128 in read/write buffers temporarily cached during host data transfers. The map data 124 may take the form of a flash transition layer (FTL) to identify physical locations at which logically addressed blocks of user data are stored.

A collision manager circuit 130 is incorporated into the controller 112 using hardware and/or firmware. As explained below, the collision manager 130 manages collisions among commands issued by the client 101 to service client commands and/or internal (background) commands issued by the core controller 116 or other aspects of the SSD.

Continuing with FIG. 2, the controller 112 can include further features such as a data compression (COMP) block 132 which applies lossless data compression to input data sets during write operations to enhance storage efficiency. An encryption (ENCR) block 134 applies cryptographic processing such as encryption/decryption to provide data security for the SSD. A temperature (TEMP) block 136 uses one or more temperature sensors to monitor and record temperatures of the SSD during operation.

A device management module (DMM) 138 supports back end processing operations of the SSD. The DMM 138 includes an outer code engine circuit 140 to generate outer code, a device I/F logic circuit 142, and a low density parity check (LDPC) circuit 144 configured to generate and use LDPC codes as part of an error detection and correction strategy to protect the data stored by the SSD. A number of registers (REGS) 146 are provided to temporarily accumulate and store data during data transfer operations.

A memory module 150 is coupled to the controller 112 via the DMM 138. The memory module 150 corresponds to the memory 104 in FIG. 1, and includes a non-volatile memory (NVM) in the form of a flash memory 152 distributed across a plural number N of flash memory dies 154. Flash memory control electronics (not separately shown in FIG. 2) facilitate parallel data transfer operations via a plural number M channels (lanes) 156. In one embodiment, the flash memory 152 has 256 dies 154 (e.g., N=256) serviced by 8 channels 156 (e.g., M=8) so that 32 dies are coupled to each channel. Only one die can be accessed by each channel at a time, although up to eight dies can be accessed in parallel at a time using all eight channels. Other arrangements can be used, including other numbers of dies and channels, other arrangements of the same, etc.

While not limiting, modern SSDs and other data storage device systems are often formed from integrated memory modules such as 104, 150 that are commercially available from a source of such devices. The memory modules are integrated into an SSD by a device manufacturer which supplies the controller functions in a separate controller 102, 112. The controller may be a single integrated circuit such as in the case of a system on chip (SOC) design, or a grouping of integrated circuits.

In this arrangement, the controller and memory modules are separate operational entities Which communicate across one or more internal command and data interfaces. A pull system is commonly used in which the controller issues commands to the memory, and then repetitively sends status inquiries to the memory to determine whether the commands have been completed.

Once the memory signals that a particular command has been completed, the controller may issue additional commands to the memory. For example, when the memory, sends a command complete status for a read command, the controller may send a data transfer command to cause the memory to transfer the recovered data to the controller. While any number of different schemes can be employed to handle the interactions between the controller and the memory, it will be noted at this point that the various embodiments presented herein are particularly directed to improvements in the command and data exchanges between the controller and the memory.

Figure 3:
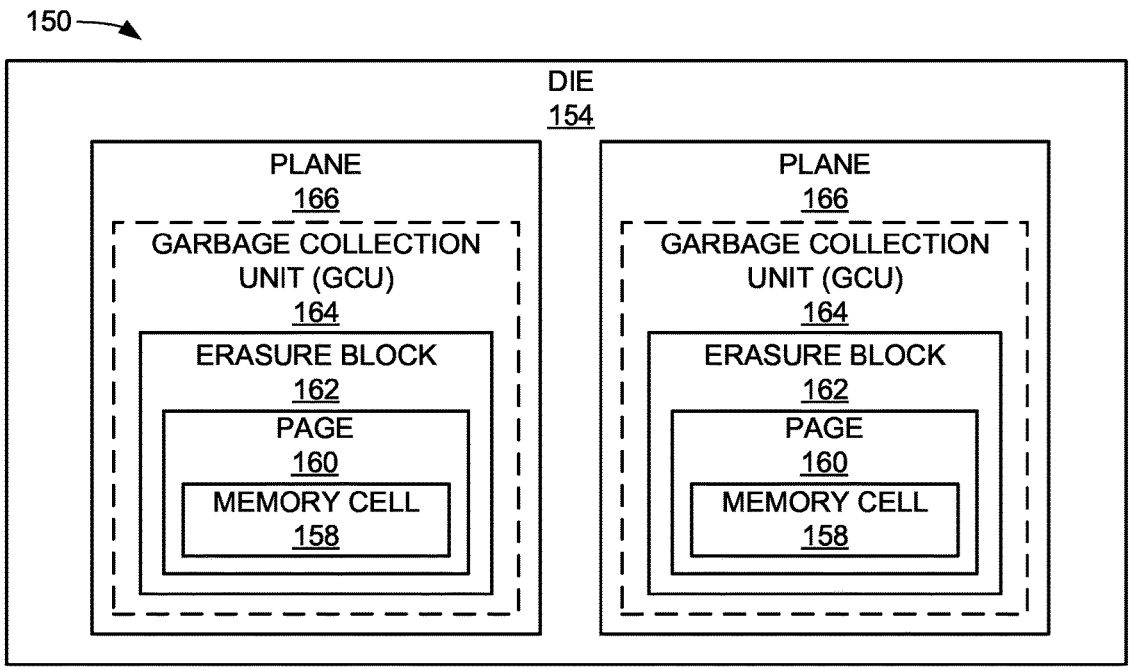
FIG. 3 shows a physical and logical layout of a flash die from FIG. 2 in some embodiments.

FIG. 3 shows a physical/logical arrangement of the various flash memory dies 154 in the flash memory module 150 of FIG. 2 in some embodiments. Each die 154 incorporates a large number of flash memory cells 158. The cells may be arrayed in a three-dimensional (3D stacked) arrangement with various control lines (e.g., source, bit, word lines) to access the cells. Each memory cell may take the general form of a MOSFET (metal oxide semiconductor field effect transistor) with respective gate, drain and source interconnections. Each cell further includes a floating gate electrically isolated from the control gate adapted to store accumulated charge to provide a programmed state.

Groups of cells 158 are interconnected to a common word line to accommodate pages 160, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), 4 LCs (four-level cells with four bits per cell), and so on. Generally, n bits of data can be stored to a particular memory cell 158 using $2^n$ different charge states (e.g., TLCs use eight distinct charge levels to represent three bits of data, 4 LCs use sixteen distinct charge levels to represent four bits of data, etc.). The storage size of a page can vary; some current generation flash memory pages are arranged to store 32 KB (32,768 bytes) of user data plus associated LDPC code bits.

The memory cells 158 associated with a number of pages are integrated into an erasure block 162, which represents the smallest grouping of memory cells that can be concurrently erased in a NAND flash memory. A number of erasure blocks 162 are incorporated into a garbage collection unit (GCU) 164, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle (garbage collect) the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 164 nominally uses a single erasure block 162 from each of a plurality of dies 154, such as 32 dies. The dies in a given GCU may be affixed to a single channel 156, or spread across multiple channels (see FIG. 2).

Each die 154 may further be organized as a plurality of planes 166. Examples include two planes per die as shown in FIG. 3, although other numbers of planes per die, such as four or eight planes per die can be used. Generally, a plane is a subdivision of the die 154 arranged with separate read/write/erase circuitry such that a given type of access operation (such as a write operation, etc.) can be carried out simultaneously by each of the planes to a common page address within the respective planes.

Figure 4:
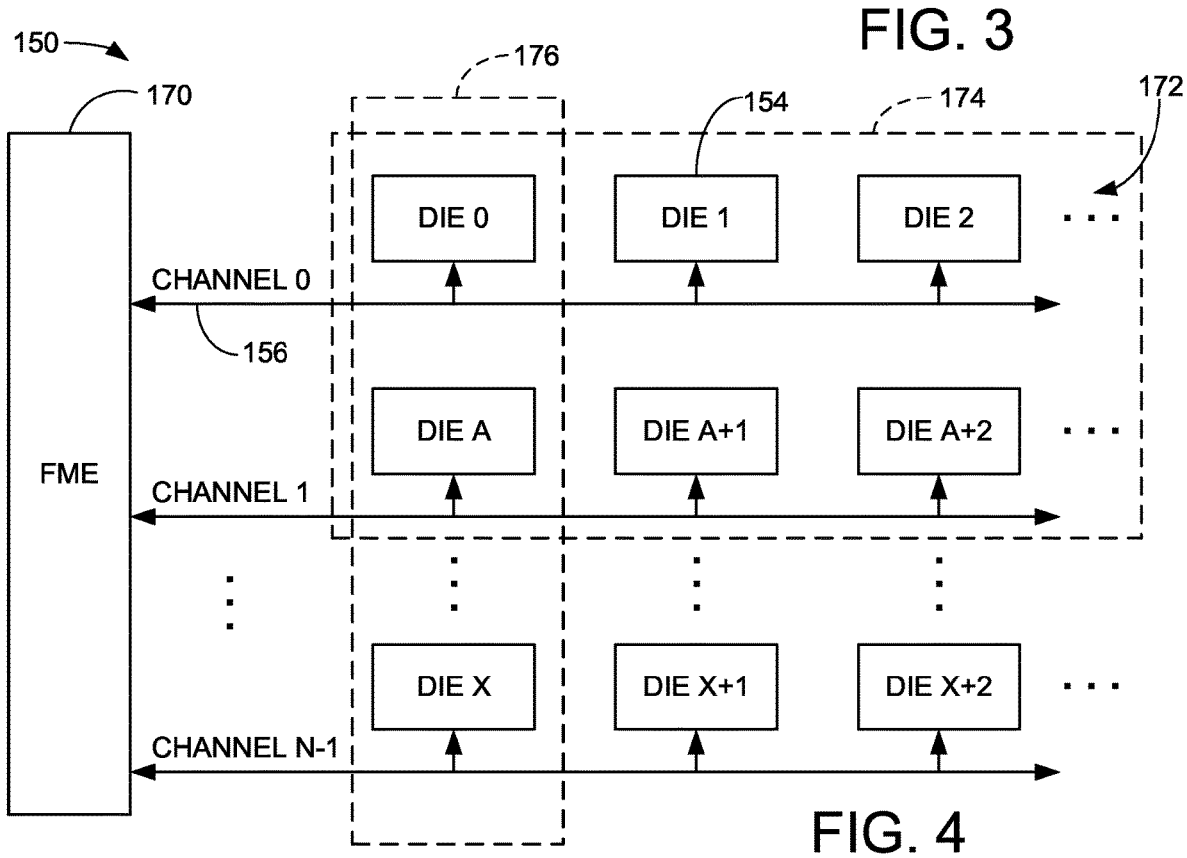
FIG. 4 illustrates an arrangement of the non-volatile memory (NVM) of FIG. 2 as different die sets in some embodiments.

FIG. 4 shows an arrangement of the flash memory dies 154 in conjunction with a flash memory electronics (FME) module 170 in further embodiments. The FME 170 may be divided among multiple processors that serve, collectively, as a front end for the flash memory module 150 (see FIG. 2). Groups of the dies 154 are connected to individual channels 156 to form die sets 172. Each die set 172 represents the dies 154 connected to an individual die. As noted above, one configuration provides a total of 256 dies interconnected using eight (8) channels so that each channel is connected to 32 dies. Other arrangements can be used. Only a single die can be accessed via the associated channel at a time. The dies 154 can be arranged into different groupings, such as a first grouping 174 which incorporates all of the dies affixed to the first two channels 156 (e.g., channels 0 and channel 1). In this case, the first grouping 174 constitutes the first 64 dies in the array.

A second die grouping is represented at 176. This represents a single die (8 in total) that are spread across all of the channels 156 (from channel 0 to channel N−1). Other die groupings can be made as desired. It will be appreciated that accessing die group 174 requires access to channels 0 and 1, while accessing die grouping 176 requires access to all of the channels (channels 0 through N−1). Different arrangements of the dies thus provides different access rates; if the dies are arranged into subgroups that use subsets of the available channels, then faster average I/O transfer rates can be obtained in parallel for multiple data sets; if the arrangements of the dies are provided across all the channels, then individual data sets across all the channels can provide faster I/O transfer rates but other transfers will need to wait until all of the channels are available, and so on.

Figure 5:
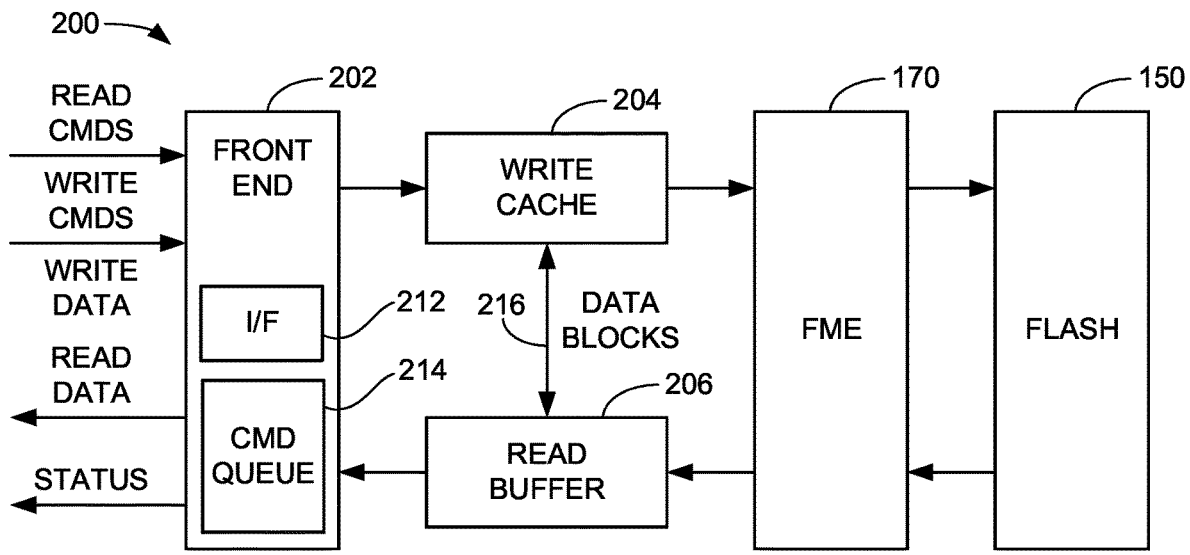
FIG. 5 depicts data paths through the SSD during the servicing of client access (read and write) commands in some embodiments.

FIG. 5 shows another aspect of the SSD 110 of FIG. 2, with regard to data transfer circuitry 200. The circuitry 200 of the SSD 110 includes a front end 202, a write cache 204, and a read buffer 206. These elements interface with the flash memory electronics (FME) 170 and the flash memory module 150.

The front end 202 interfaces with one or more client devices 101 (FIG. 1) using an interface (I/F) circuit 212. Pending access commands, either from the client device or internally generated, are stored in one or more command queues 214.

During normal operation of the SSD 110, the client(s) will issue various access commands including read and write commands. Each client read command will constitute a request for some logical range (e.g., LBA range) of blocks to be retrieved from flash 150. Each client write command will constitute a request to store some logical range of blocks to the flash, and will be accompanied by a transfer of the associated writeback data from the client to the storage device.

The front end 202 processes these and other commands and arranges the respective read and write commands into one or more of the command queues 214 pending execution. The writeback data are stored in the write cache 204 and are subjected to processing as described above in FIG. 4 to arrange the writeback data into code words, pages, parity sets, etc. Additional processing may be applied as well, such as encryption and compression.

At such time that a command scheduler (not separately shown) of the controller 112 selects the next command to be serviced, the associated command/data are forwarded to the FME 170, which in turn directs the same to the flash 150. As noted above, the FME 170 is a rudimentary front end on each die or set of dies and serves to direct commands and data to the local read/write/erase: circuitry of the respective planes. In the case of a write command, the writeback data are written to the next set of available pages 160 in an allocated GCU 164 (FIG. 3). In the case of a read command, the data are retrieved, subjected to error correction and other signal processing steps, and placed in the read buffer. The map metadata are accessed and updated as required during these operations.

Client read commands tend to receive priority over other commands, including client write commands and background commands, on the basis that the client is likely waiting for the requested readback data before it can proceed with subsequent processing steps. At the same time, the command scheduler function of the controller needs to execute the background operations (e.g., garbage collection, map updates, calibrations, etc.) at a sufficient rate to enable the storage device to continue to service the client access commands at acceptable performance levels. Another complicating factor is that the various competing pending commands and background operations may require the use of shared resources that have to be made available before the next command can be carried out. These resources can include data buffers, decoders, encryption/decryption circuitry, lanes, dies, registers, map data, etc.

Continuing with FIG. 5, the front end 202 provides various statuses to the client, including command complete statuses when commands are completed. For completed read commands, the command complete status may indicate that the requested readback data have been successfully retrieved and are now available for transfer from the read buffer 206. If writeback caching techniques are employed, the front end 202 may proceed to issue a write command complete status to the client, even if the writeback data are still pending in the write cache 204 and have not yet been written to the flash 150. To this end, the write cache 204 may take the form of NVM, such as NAND or NOR flash, although such is not necessarily required. The read buffer 206 may normally be volatile memory, such as DRAM, since the readback data in the read buffer can always be re-read from the non-volatile flash if required. In some cases, data blocks may be internally transferred between the write cache 204 and the read buffer 206, as indicated by internal data path 216.

Figure 6:
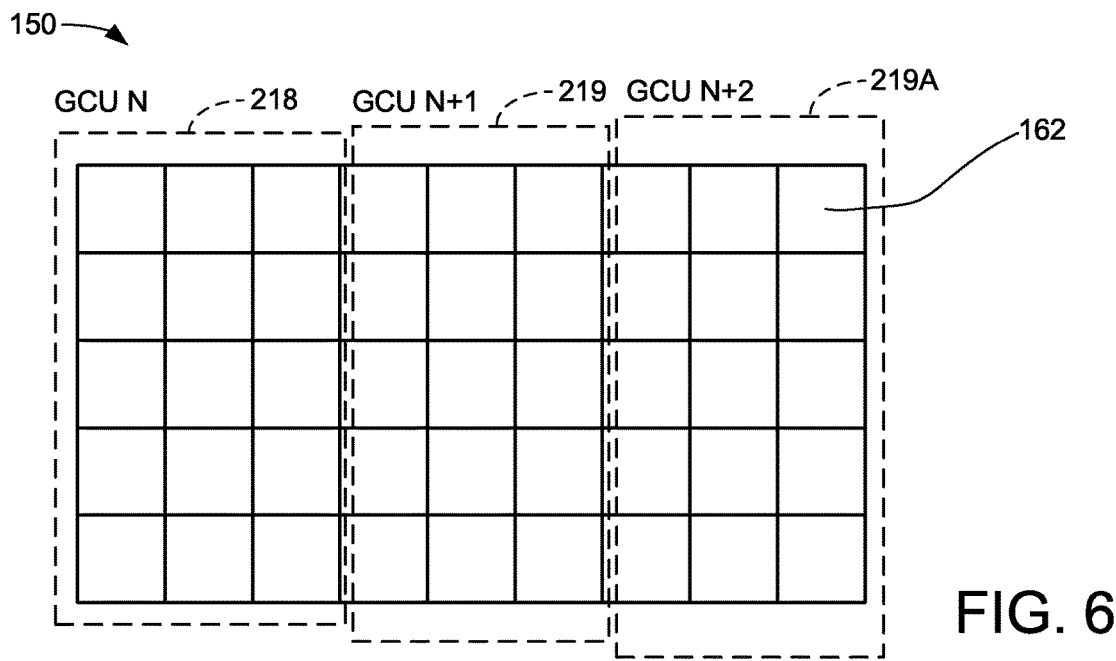
FIG. 6 shows different GCUs (garbage collection units) that can be arranged within the flash memory of the device of FIG. 2.

FIG. 6 shows different arrangements of GCUs in the flash memory 150 of FIG. 5. GCU N 218 incorporates a first set of erasure blocks 162 across various dies 154 of the flash memory 150. GCU N+1 219 incorporates a different, second set of erasure blocks 162 across various dies 154 of the flash memory 150. GCU N+2 incorporates yet another different, third set of erasure blocks 162 across a different set of dies 154. In one embodiment, each GCU 218, 219, 219A has 32 erasure blocks on 32 different dies, but other arrangements can be used; for example, GCU N+1 might have a different number of erasure blocks than GCU N, and GCU N+2 might have still a different number of erasure blocks than GCU N or GCU N+1. The prefetched data can be from the same GCU, or from a different GCU that utilizes the same or similar resources. It will be noted that the various erasure blocks in the respective GCUs may distributed among a common set of dies, or among different sets of dies.

Figure 7:
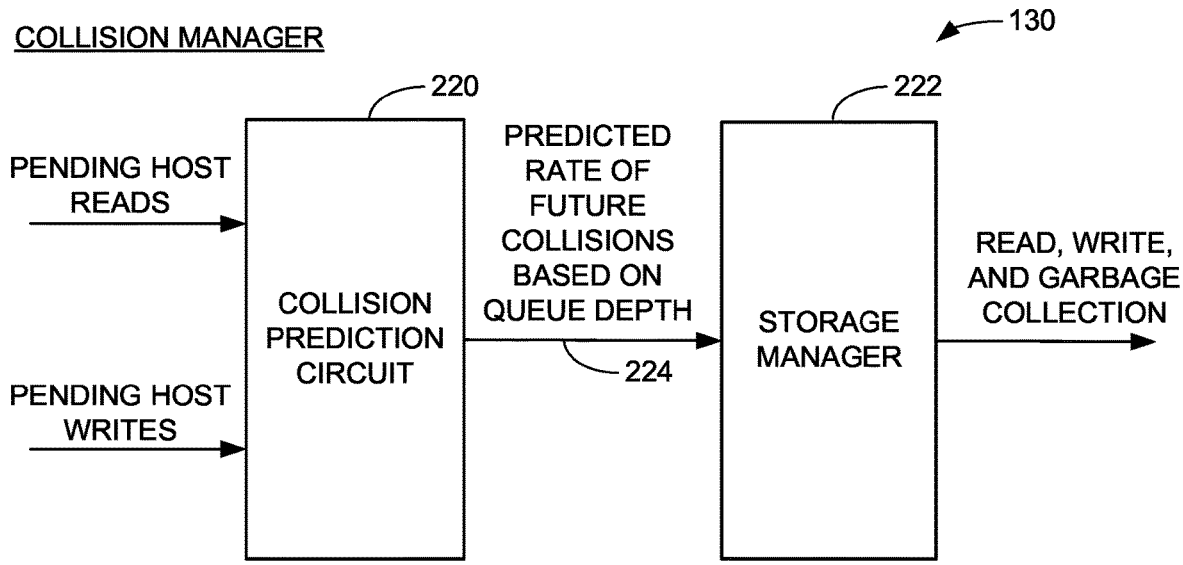
FIG. 7 depicts a collision manager circuit of the SSD in some embodiments.

FIG. 7 shows the collision manager 130 from FIG. 2 in greater detail. The collision manger 130 is configured to reduce, on a predictive basis, future potential collisions among various types of data transfer commands carried out upon the flash memory 150. Of particular interest is the reduction in collisions involving host read commands. This is based upon the fact that, in at least some operational environments, a host read command is issued by a host process to request certain data, and the host process may not be able to proceed with further operations until the requested data associated with the host read command have been actually returned.

It will be noted that this is often different from other forms of commands. For example, if a host process issues a write command, it is possible, in at least some operational configurations, for the storage device (e.g., SSD 110) to give a notification that the data associated with the write command have in fact been written to the NVM (flash memory 150), even if in fact the data are still pending in the local write cache. This notification is sometimes referred to as writeback caching, and allows the host process to continue to the next operation even if, strictly speaking, the write data have not been fully written to the final destination in the NVM. The storage device may store the data in local non-volatile cached storage (e.g., the write cache 204, FIG. 5), and take steps to ensure that the data are in fact stored in a timely manner to the flash 150. Nonetheless, writeback caching can enable the storage device to schedule the writing at a time convenient, allowing resources required by the storage device to be spent in the short term performing other operations, such as satisfying pending host read requests, while at the same time providing the necessary notification to the host process that the write command has been completed.

The same can be said for background operations internally generated by the SSD to maintain the SSD in an operationally ready state. For example, operations to carry out garbage collection operations, map updates, calibrations, etc. are background operations that do not directly impact host I/O performance. These are necessary operations, but these and other types of background operations can be scheduled as appropriate to ensure that the host(s) receive optimum quality of service (QoS) performance for those aspects that have the greatest impact upon host performance.

Accordingly, presently illustrated embodiments place emphasis upon avoiding host read collisions, and the following discussion will assume this is a goal of the configuration of the system. However, this is merely illustrative and not limiting since other configurations are envisioned where other forms of collisions are under consideration and can be equally minimized by the techniques disclosed herein.

Continuing with FIG. 7, the collision manager 130 includes a collision prediction circuit 220 and a storage manager 222. The collision prediction circuit 220 receives a number of inputs including an assessment of the total number and types of pending host read commands, as well as the total number and types of pending host write commands. Other pending types and numbers of commands, such as background commands, can be received as well. These assessments can be supplied from the command queues 214 (FIG. 5), and thus represent the current queue depth, or range, of pending commands awaiting execution.

The collision prediction circuit 220 provides information in the form of predicted rate of future collisions based on the current queue depth(s). This information is supplied to the storage manager 222 via path 224, and the storage manager 222 in turn issues various read, write and garbage collection commands to the flash memory 150 (FIG. 5) in such a way as to avoid or limit future collisions. These issued commands may be viewed as a change in a storage policy of the storage device. Various alternatives are contemplated, such as a change in the storage locations for data, a change in a total number of copies of data stored in the flash memory, a change in the manner in which garbage collection operations occur (including in some cases pre-emptive garbage collection operations), and so on.

Figure 8:
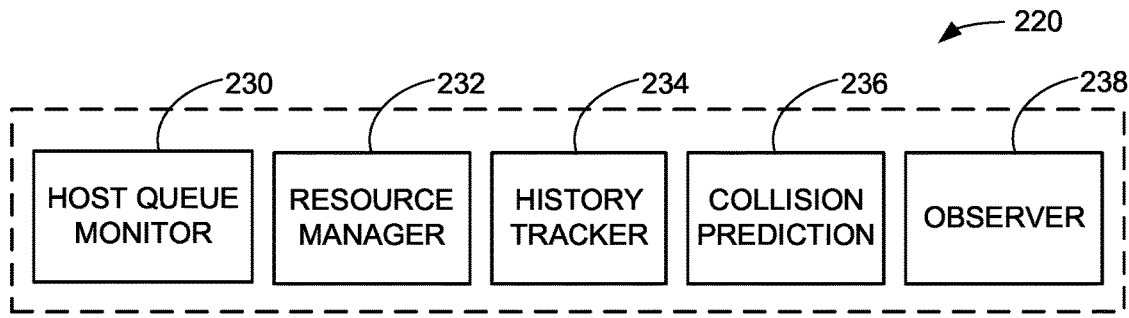
FIG. 8 illustrates aspects of the collision manager circuit of FIG. 6 in some embodiments.

FIG. 8 shows a functional block representation of the collision prediction circuit 220 of FIG. 7 in greater detail. Other configurations can be used. The circuit 220 includes a host queue monitor 230 that monitors and reports the respective numbers of various types of queued commands. As noted above, these can be limited to host commands or can be expanded to cover all pending commands.

A resource manager 232 tracks, for each of the pending monitored commands in the various queues tracked by the monitor 230, which resources will be needed in order to service the associated command. Servicing of commands can be managed to maintain a certain priority, such as priority to host read commands over all other commands.

Nevertheless, resources need to be available to manage any particular command, and the resource manager 232 will identify, track, and manage the availability of all of the system resources so that the individual commands can be completed. The necessary resources will depend on application; different dies, channels, buffers, encoding/decoding circuits, etc. may be required for each command. Each command will be tracked such that, when it is time for that command to be executed, the resource manager will indicate those resources that are necessary; contrawise, the resource manager can operate to flag to other aspects of the circuitry when the necessary resources become available.

A history tracker circuit 234 tracks recent historical operation of the storage device with respect to various commands. This can include the generation and storage of a tracking history in the form of a data structure in a memory. This can be useful in a number of ways, including through the estimation of recent command history by the storage device, recent accesses to the flash memory to determine if certain die/channel combinations are being utilized at a higher rate than other combinations, etc. The history data can thus be at the logical (host) level and/or the physical (NVM) level, or both.

A collision prediction circuit 236 operates to predict if certain collisions may occur in the near future for (in this example) the pending host read commands, or future expected host read commands. The predictions are based on past history (as supplied by the history tracker circuit 234), the resources required (resource manager 232) and pending commands/queue depth (queue monitor 230). For example, if a relatively large number of recent host commands have been for a relatively small band of logical block addresses, based on current trends it may be predicted that such requests will continue in the near future, and therefore data blocks that fall within that logical range, or having logical addresses that are associated with that range, may be subject to special processing to avoid future collisions.

In another example, it may be determined that recent host and SSD activity has been concentrated in a certain physical range, such as certain die/channel combinations, it may be determined that there may be a tendency for such concentration to continue in the near future, and so operations in this physical range may be subject to special processing to avoid future collisions. These and other indications form part of the predicted rate of future collisions that are supplied to the storage manager 222 (FIG. 7), to enable the storage manager to make determinations as to where certain I/O operations should take place with the flash memory 150.

Finally, an observer block 238 provides closed loop monitoring of the operation of the collision prediction circuit 220, including a determination to which subsequent collisions are in fact experienced. This feedback can be used to adjust the operation of the other circuits shown in FIG. 8, as well as to adjust the operation of the storage manager 222.

Figure 9:
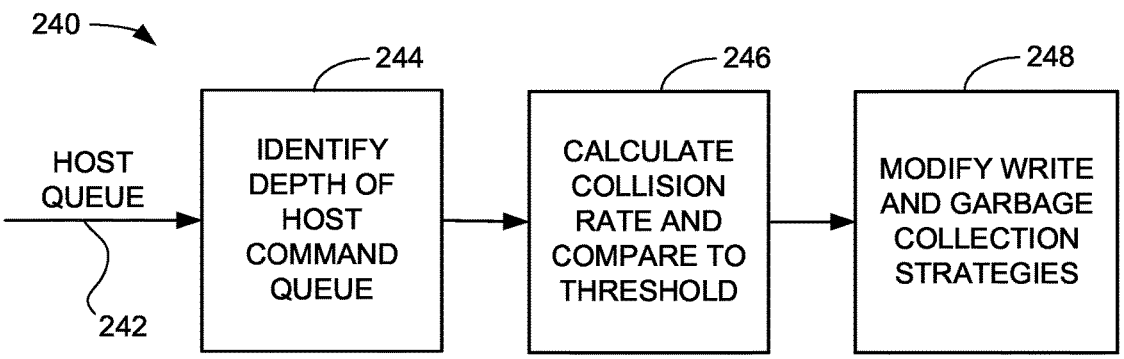
FIG. 9 illustrates operation of the collision manager circuit in some embodiments.

FIG. 9 shows a flow diagram 240 to illustrate operation of the collision manager 130 as depicted in FIGS. 7-8. Host queue information is supplied at line 242 to operational block 244, which identifies the depth and character of the pending host command queue. Based on this information, as well as other information described above, block 246 determines a calculated collision rate for the existing host read commands as well as potential future received read commands. This calculated collision rate can be compared to a predetermined threshold. If the calculated collision rate exceeds the predetermined threshold, a first mode of operation may be enacted, whereas if the calculated collision rate is less than the predetermined threshold, a different second mode of operation may be enacted.

It is contemplated that some number of collisions will necessarily occur in any system with a reasonable amount of I/O, so the operation of block 246 determines whether the amount of expected collisions will surpass the threshold, which may be set to distinguish between normal levels of operation and heightened levels of collisions that will adversely affect host I/O performance. If so, various operations of the circuitry will be modified as indicated by block 248, such as modifications to write strategies and garbage collection strategies, which are carried out by the storage manager 222. The changes enacted by block 248 are characterized as changes in at least one storage policy for the flash memory.

As explained below, the changes to write strategy may include selecting a different target location for the write data, or the writing of the write data to multiple locations within the flash memory. The changes to garbage collection strategy may be a reduction in the percentage of stale data necessary to trigger a garbage collection operation, or may involve the forced operation of a garbage collection action to preemptively advance a garbage collection operation to collect and distribute the current version data among multiple GCUs that utilize different resources to enable parallel recovery of the data. Other steps can be taken alternatively or as well.

Figure 10:
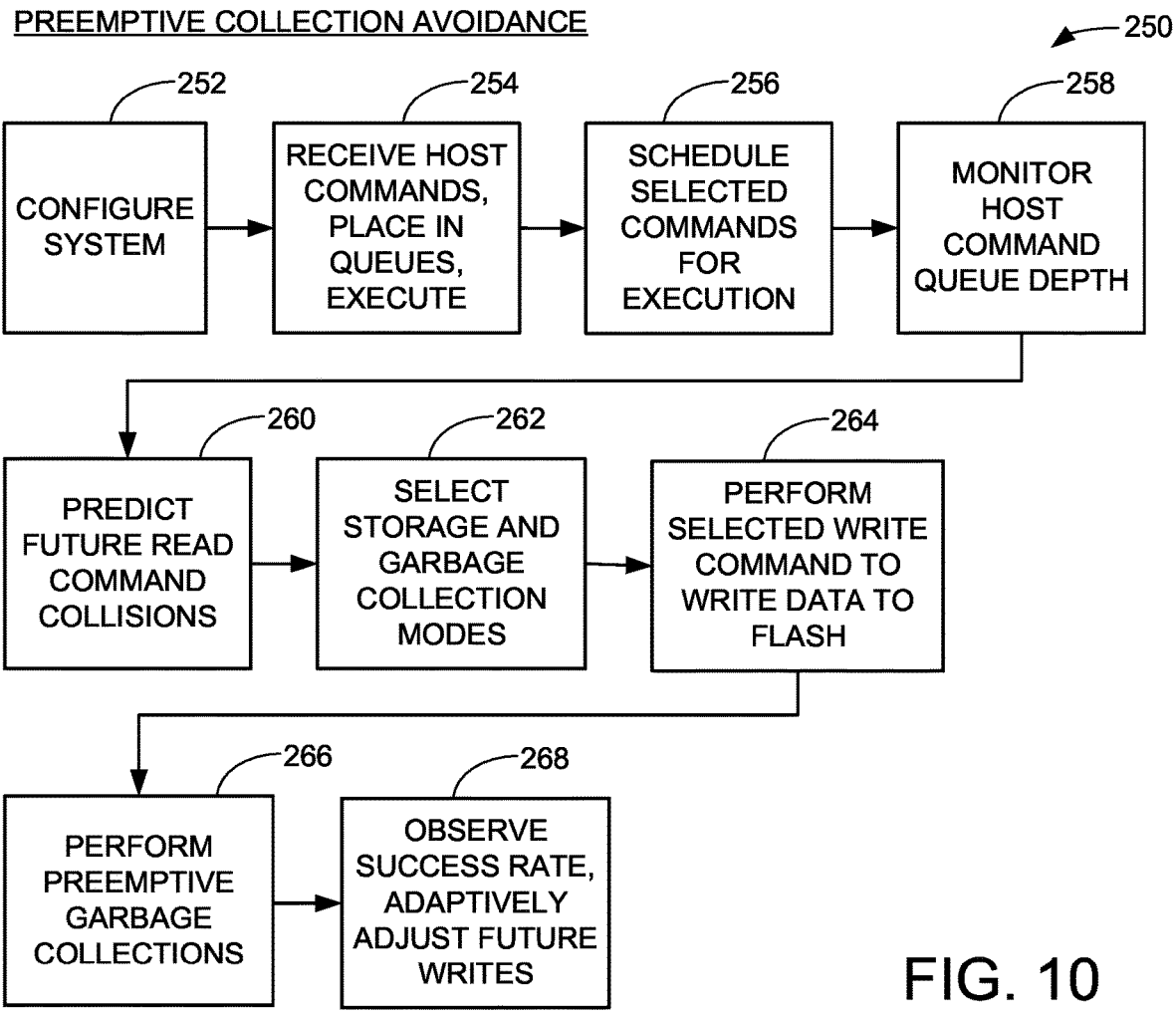
FIG. 10 is a sequence diagram to demonstrate collision management by the SSD through the use of preemptive garbage collection operations in some embodiments.

FIG. 10 is a sequence diagram for a pre-emptive collision avoidance routine 250 carried out in accordance with some embodiments. This routine sets forth an exemplary sequence in accordance with the foregoing discussion. Other steps can be carried out so this is merely exemplary and is not limiting.

Block 252 shows an initial configuration of the system. This can include but is not limited to an initialization sequence for the system during which the SSD (or other storage device, or group of storage devices, etc.) is powered up and transitioned to a normal mode of operation. Block 254 shows that various host commands are received and placed into one or more command queues pending operation. It will be appreciated that during continued operation addition background commands will additionally be generated and placed into various queues.

Commands are scheduled for execution at block 256. At this point, the system may operate without reference to the specific operation of the collision manager 130; it may be helpful to initially allow the system to operate based on other factors, since some amount of historical data may be necessary in order for the collision manager 130 to operate to make intelligent decisions with regard to an assessment of the current operational environment. In alternative embodiments, prior operations may be stored, such as by the historical tracker based on prior operations since the most recent initialization operation, that enable the collision manager to operate effectively from the time of initialization.

Block 258 shows operation of the system to monitor the current host command queue depth. As commands are received and queued, this information allows the collision manager to assess and correctly determine what sorts of operations should be carried out by the storage device (in toto) in order to reduce collisions.

Block 260 shows the operation to predict future read collisions based on the ongoing workload and the future predicted workload. This sort of operation is continuously carried out in the background, even if no changes to system operation take place. In this way, this block represents a monitoring function that operates in the background to monitor and determine, at appropriate times, at which the storage device (e.g., SSD, other storage devices, array of storage devices, etc.) should change the mode of operation in order to improve future performance.

Block 262 shows the selection of certain operational modes, including changes to garbage collection and write modes, for at least certain ranges of data blocks. This change in operational mode is based on the foregoing discussion, and may indicate that certain locations of the NVM (flash memory 150), and/or certain ranges of LBAs (logical block addresses or other logical addressing schemes) are hot data; that is, those are such data ranges that may be of highest interest to the host(s) accessing the storage device(s).

For example, and not by way of limitation, if certain blocks of data are presented with a high level of host interest (e.g., certain blocks of data are highly requested in read and write operations so that either the data are updated frequently or read frequently), then it may be advantageous to adjust the current garbage collection and/or write strategies for such data blocks. In other words, if blocks of data from a range X-Y, where X and Y are different logical representations of addresses used for the data blocks at the host level, are of significant interest, then data blocks in this range, as well as data blocks in associated ranges, may be subject to special processing.

In another example, and not by way of limitation, if certain physical ranges of memory are presented with a high level of host interest (e.g., a lot of write and/or read requests are being presented to a certain location in the flash memory), it may be advantageous to distribute the data stored to these locations to other locations within the flash memory in order to enhance the ability of the requesting hosts to retrieve or update the data stored in those locations.

Accordingly, the operation of block 262 in FIG. 10 may include the advancement of a garbage collection operation upon the GCUs that store data associated with the commands expected to have future collisions. There may be a selected GCU that is not yet full of data, and yet the storage manager 222 may proceed to perform a garbage collection on the selected GCU. The current version data blocks stored in the selected GCU may be distributed to multiple other GCUs in the system, each GCU having a different set of resources necessary to access that data.

Block 264 shows this distributed operation. Based on an assessment that host read collisions may occur in the future based on the logical range of data for a selected set of pending write data, the selected set of pending write data may be written to a new, different location, or multiple copies of the pending write data may be written to multiple locations in the flash memory. This addresses the problem of potential host collisions based on the new data to be written to the flash memory.

Block 266 shows another aspect of this distributed operation. This aspect takes into account the data already stored in the flash memory. Pre-emptive garbage collection operations are carried out upon one or more GCUs to distribute the data to new, other locations (GCUs) that do not share overlapping resources. For example, referring again to FIG. 6, some sets of current version data may be relocated from GCU N and moved to GCU N+1, while other sets of current version data may be relocated from GCU N+1 to GCU N+2. In this way, future expected read operations that would have otherwise been applied to GCU N will now be distributed between GCU N+1 and N+2.

Block 268 shows a follow up monitoring operation to monitor the collision rate to determine if the pre-emptive corrective actions from blocks 264 and 266 reduced the actual collision rate. This can be monitored in a variety of ways, including determining which read operations actually happened upon the relocated and newly written (including duplicated) data. This performance can be used to adjust the prediction aspects as well as the relocation/writing aspects of the system. Ultimately, the goal is to reduce the rate of actual read collisions experienced by the system.

Figure 11:
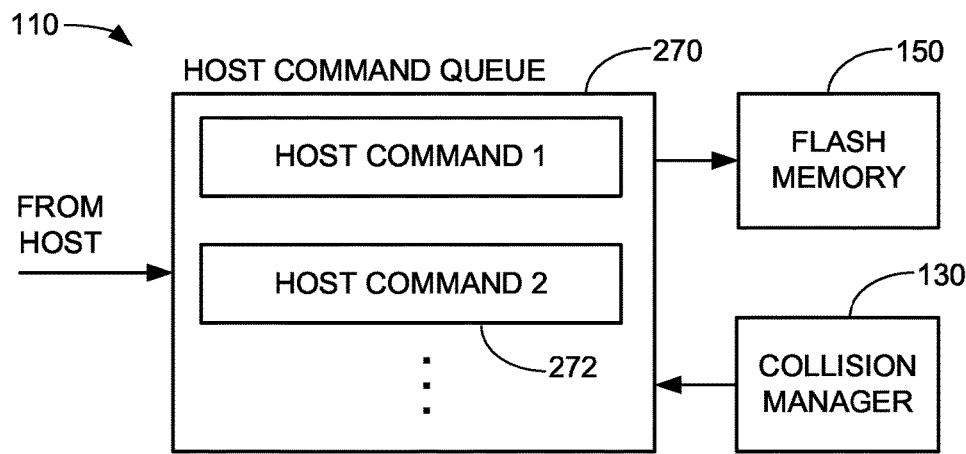
FIG. 11 shows aspects of the host command queue(s) of the SSD during operation of the sequence of FIG. 10 in some embodiments.

FIG. 11 shows a functional block representation of a host command queue 270. This may form a portion of the queues 214 in FIG. 5 discussed above. Included in the queue 270 are a number of host commands 272 including a first command and a second command. Any number of commands can be aggregated and controlled. It will be appreciated that, based on the operation of the collision manager, each of the host commands 272 may be subjected to different processing, including duplication of data in multiple locations, the execution of a garbage collection operation followed by the storage of write data to the newly erased GCU, etc.

As noted above, various embodiments have contemplated operation in the context of an SSD, but this is merely for purposes of illustration and not limiting. Other forms of processing devices, including but not limited to hard disc drives (HDDs), hybrid drives, tape drives, etc. can also incorporate the various embodiments presented herein. Systems that incorporate multiple storage devices into an array are also contemplated.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
accumulating, in a command queue, pending data transfer commands to transfer data between an NVM and a local memory, the pending data transfer commands comprising write commands to write data to the NVM from a host device and read commands to retrieve previously stored read data to the host device from the NVM;
predicting future collisions among the pending read commands accumulated in the command queue; and
enacting a change in a storage policy associated with the NVM that reduces a future rate of the predicted future collisions by performing a garbage collection operation upon a first garbage collection unit (GCU) in the NVM that uses a first set of resources by transferring a first set of valid data previously stored in the first GCU to a second GCU in the NVM that uses a different, second set of resources and transferring a second set of valid data previously stored in the first GCU to a third GCU that uses a different, third set of resources, erasing the first GCU, and storing selected write data associated with a selected pending write command to the first GCU.

2. The method of claim 1, wherein the change in the storage policy is enacted responsive to a total number of the predicted future collisions exceeding a predetermined threshold, and wherein the garbage collection operation is carried out upon the selected GCU prior to the selected GCU achieving a total amount of stale data that exceeds a predetermined stale data amount threshold.

3. The method of claim 1, wherein the change in the storage policy comprises switching from a normal, first storage policy to an enhanced, second storage policy, wherein during the first storage policy garbage collection operations are carried out upon each GCU in the NVM responsive to a total amount of stale data in the GCU reaching a normal stale data threshold, and wherein during the second storage policy the garbage collection operation is carried out upon the selected GCU while the selected GCU has a total amount of stale data less than the normal stale data threshold.

4. The method of claim 1, wherein the NVM comprises a flash memory comprising a plurality of semiconductor dies, wherein each of the GCUs span a different combination of the semiconductor dies.

5. An apparatus comprising:
a main non-volatile memory (NVM);
a local memory;
a command queue that lists pending data transfer commands received from a host device to transfer data between the NVM and the local memory, the pending data transfer commands comprising write commands to transfer, from the local memory to the NVM, host data received from the host device and read commands to transfer, from the NVM to the local memory and from the local memory to the host device, previously stored host data in the NVM;
a collision manager configured to predict future collisions among the pending read commands in the command queue; and
a storage manager which enacts a change in a storage policy associated with the NVM that reduces a future rate of the predicted future collisions responsive to a total number of the predicted future collisions exceeding a predetermined threshold, the change in the storage policy comprising performing a garbage collection operation upon a first garbage collection unit (GCU) in the NVM that uses a first set of resources by transferring a first set of valid data previously stored in the first GCU to a second GCU in the NVM that uses a different, second set of resources and transferring a second set of valid data previously stored in the first GCU to a third GCU that uses a different, third set of resources, erasing the first GCU, and storing selected write data associated with a selected pending write command to the first GCU.

6. The apparatus of claim 5, wherein the change in the storage policy further comprises a duplication of the selected write data associated with the selected pending write command to write a copy of the selected write data to at least a selected one of the second or third GCUs.

7. The apparatus of claim 5, wherein the change in the storage policy comprises switching from a normal, first storage policy to an enhanced, second storage policy, wherein during the first storage policy garbage collection operations are carried out upon individual GCUs in the NVM responsive to a total amount of stale data in the individual GCUs reaches a normal stale data threshold, and wherein during the second storage policy the garbage collection operation is carried out upon the selected GCU while the selected GCU has a total amount of stale data less than the normal stale data threshold.

8. The apparatus of claim 5, wherein the selected GCU upon which the garbage collection operation is performed is selected responsive to the first set of resources associated with the selected GCU.

9. The apparatus of claim 5, wherein the collision manager comprises a host queue manager that monitors a total number of pending host commands from a host, a resource manager that identifies associated resources required to execute each of the pending host commands, and a history tracker that maintains, as a data structure in a memory, a history of recent commands from the host.

10. The apparatus of claim 9, wherein the collision manager further comprises a collision prediction circuit which predicts the future collisions involving two or more of the pending read commands based on overlapping resources to be utilized by each of the two or more of the pending read commands.

11. The apparatus of claim 9, wherein the collision manager further comprises an observer which measures an actual collision rate and compares the actual collision rate to the future rate of the predicted future collisions.

12. The apparatus of claim 5, wherein the NVM comprises a flash memory comprising a plurality of semiconductor dies and associated channels, wherein the GCUs are distributed across different combinations of the semiconductor dies and the associated channels.

13. The apparatus of claim 5, wherein at the time in the change in the storage policy, at least one of the pending read commands in the command queue identifies data stored in the second GCU and at least one of the pending read commands in the command queue identifies data stored in the third GCU.

14. The apparatus of claim 5, wherein the collision manager and the storage manager are realized using at least one programmable processor with associated programming instructions in a form of firmware (FW) stored in a local memory and executed by the at least one programmable processor.

15. The apparatus of claim 5, wherein the command queue comprises host commands issued by the host and background commands generated by a controller associated with the NVM.

16. A solid-state drive (SSD), comprising:
a flash memory configured as a main memory store for a host device, the flash memory comprising a plurality of semiconductor dies accessed by an associated plurality of channels, the flash memory arranged into a plurality of garbage collection units (GCUs) each individually allocated and erased as a unit and each spanning a different combination of the semiconductor dies and the associated channels;
a controller circuit configured to manage data transfers between the flash memory and the host device using a local memory and a command queue that lists pending data transfer commands comprising host write commands to write data to the flash memory and host read commands to retrieve previously written read data from the flash memory;
a collision manager circuit configured to predict future collisions among the pending read commands in the command queue; and
a storage manager circuit which enacts a change in a storage policy associated with the flash memory that reduces a future rate of the predicted future collisions by performing a garbage collection operation upon a first GCU in the NVM that uses a first set of resources by transferring a first set of valid data previously stored in the first GCU to a second GCU in the NVM that uses a different, second set of resources and transferring a second set of valid data previously stored in the first GCU to a third GCU that uses a different, third set of resources, erasing the first GCU, and storing selected write data associated with a selected pending write command to the first GCU, the change in the storage policy enacted responsive to a total number of the predicted future collisions exceeding a predetermined threshold.

17. The SSD of claim 16, wherein the change in the storage policy further comprises a duplication of the selected write data so that a copy of the selected write data is written to at least one other GCU within the flash memory.

18. The SSD of claim 16, wherein the change in the storage policy comprises switching from a normal, first storage policy to an enhanced, second storage policy, wherein during the first storage policy garbage collection operations are carried out upon each GCU in the NVM responsive to a total amount of stale data in the GCU reaching a normal stale data threshold, and wherein during the second storage policy the garbage collection operation is carried out upon the selected GCU while the selected GCU has a total amount of stale data less than the normal stale data threshold.

19. The SSD of claim 16, wherein the selected GCU upon which the garbage collection operation is performed is selected responsive to the first set of resources associated with the selected GCU being further associated with at least one of the pending read commands in the command queue.

20. The SSD of claim 16, wherein the collision manager comprises a host queue manager that monitors a total number of pending host commands from a host, a resource manager that identifies associated resources required to execute each of the pending host commands, and a history tracker that maintains, as a data structure in a memory, a history of recent commands from the host.

* * * * *